W. S. HOWELL, Jr.
AERONAUTICAL DEVICE.
APPLICATION FILED FEB. 10, 1911. RENEWED NOV. 28, 1916.
1,232,313.
Patented July 3, 1917.
2 SHEETS—SHEET 1.
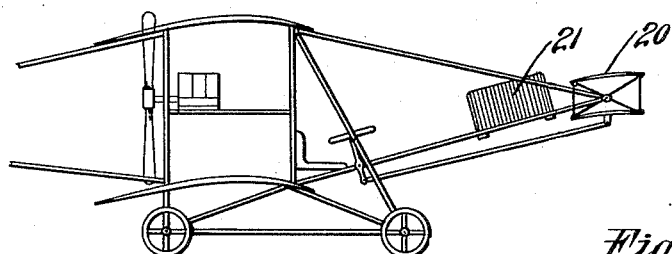
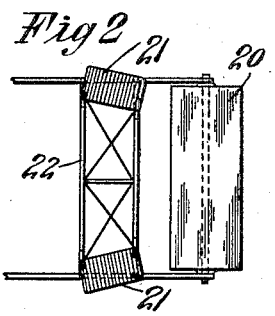
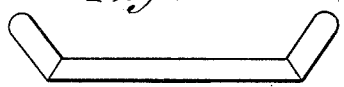
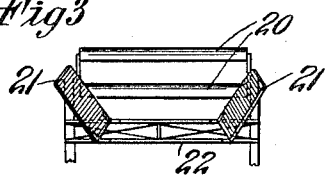
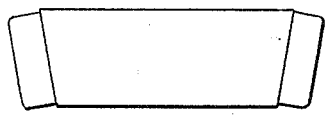
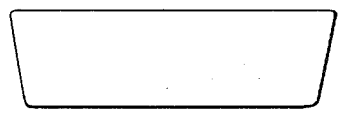
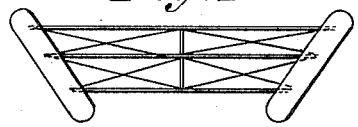
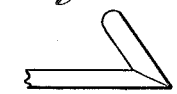
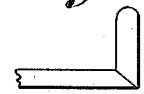
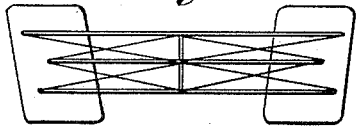
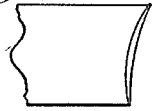
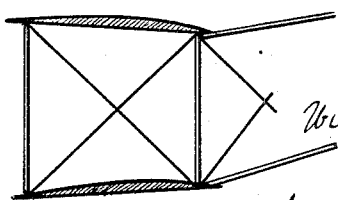

W. S. HOWELL, Jr.
AERONAUTICAL DEVICE.
APPLICATION FILED FEB. 10, 1911. RENEWED NOV. 28, 1916.
1,232,313.
Patented July 3, 1917.
2 SHEETS—SHEET 2.
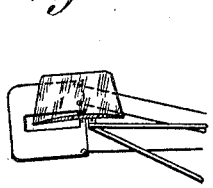
Fig.16
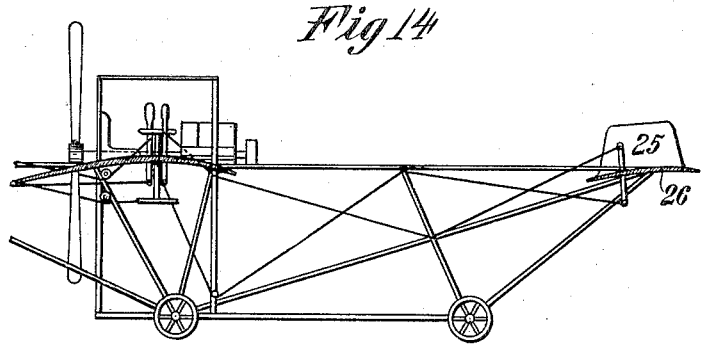
Fig.14
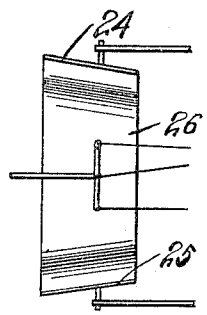
Fig.17
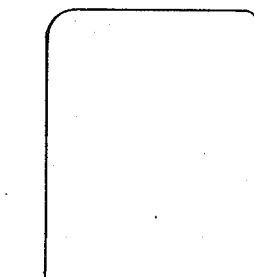
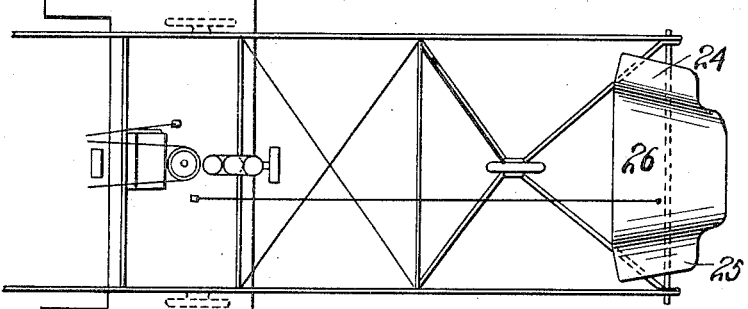
Fig.15
Witnesses:
Louise Enderle
Aug. R. Jungmen
Wilson S. Howell Jr. Inventor
By his Attorney

UNITED STATES PATENT OFFICE.

WILSON S. HOWELL, JR., OF NEW YORK, N. Y.

AERONAUTICAL DEVICE.

1,232,313.      Specification of Letters Patent.      Patented July 3, 1917.

Application filed February 10, 1911, Serial No. 607,855. Renewed November 28, 1916. Serial No. 133,986.

*To all whom it may concern:*

Be it known that I, WILSON S. HOWELL, Jr., a citizen of the United States, residing at New York city, in the county of New York and State of New York, have invented certain new and useful Improvements in Aeronautical Devices, of which the following is a specification, reference being had therein to the accompanying drawing.

My invention relates to improvements in aeronautical devices and more particularly, in its adaptation as shown in the accompanying drawings, it has special reference to aeroplanes. The invention contemplates the construction or arrangement of surfaces producing a steadying and correcting tendency upon the machine while in flight, a stabilizing effect, and to this end said surfaces may be applied at various parts of the machine as will be hereinafter more fully set forth.

Referring to the accompanying drawings, Figure 1 is a side elevation with part broken away illustrating an application of the invention as applied to what has become known as a Curtiss type of aeroplane. Fig. 2 is a plan view of the front part of the aeroplane shown in Fig. 1, and Fig. 3 is a view of the front part of said machine as observed from the rear. Fig. 4 is a front elevation of an application of the invention as applied to the elevating or forward lifting surface of an aeroplane, and Fig. 5 is a plan view of the same. Fig. 6 is a similar view to Fig. 4 except that the entire surface is curved about the longitudinal axis, and Fig. 7 is a plan view of the same. Fig. 8 shows a portion of an elevating or supporting surface with the stabilizing surface directed inwardly instead of outwardly as shown in the previous figures. Fig. 9 is a plan view looking downwardly upon the same. Fig. 10 is a similar view to Fig. 8 except that the stabilizing surface is perpendicular, and Fig. 11 is a plan view looking downwardly upon the same. Fig. 12 is a front view of a pair of such surfaces secured upon a suitable framework without an independent supporting or elevating surface in combination therewith. Fig. 13 is a plan view looking downwardly upon the same. Fig. 14 is a side elevation of one of my specially designed monoplane types of flying machine with the tail omitted, and Fig. 15 is a plan view of the same. Fig. 16 represents the tail section in side elevation of an ordinary type of flying machine showing an application of my invention. Fig. 17 represents a similar tail section in plain view. Fig. 18 shows a combination of horizontal surfaces having a different distance of separation at the front from the rear edges.

Referring to Fig. 1, 20 is what is generally known as the elevator or forward controlling surface of the machine and may be constructed to operate independently of the surfaces referred to as the subject of this invention and which are more particularly shown at 21 in said view. Referring to Figs. 2 and 3, it will be observed that such surfaces are suitably mounted upon a framework such as 22 so as to be at an angle to the longitudinal line of the machine and also may be mounted at an angle slightly to the vertical as shown. In Figs. 4 and 5 it will be observed that the surfaces are connected to or a continuation of the front supporting or elevating surface and may be so constructed instead of being simply mounted independently upon suitable connecting framework. In the modification shown in Figs. 6 and 7, the wall of the curved surface representing an elevating or supporting surface is preferably tapered to a smaller diameter forwardly as shown to secure the steadying and correcting effect. Figs. 8 and 9 also show a continuous or connected surface with the lateral portions or walls directed inwardly instead of outwardly, and Figs. 10 and 11 show a similar construction with the walls perpendicular. Of course it will be understood that with the perpendicular walls the machine when traveling on a course perfectly horizontal with the earth and in perfect balance will encounter a minimum upward or downward pressure on said walls and consequently in such construction there is no lift. In Figs. 8 and 9 however, there is a downward pressure encountered which in addition to steadying lateral movement, also serves to steady vertical movement. While this construction does not incorporate the advantages of the outwardly directed surfaces, it will be readily appreciated that it has its known advantages under special circumstances. In the application of these surfaces indicated by reference characters 24 and 25 in Figs. 14 and 15, it will be observed that they are attached to or formed with the forward elevating or supporting surface 26 directly, and as shown in this particular figure may be made movable therewith, and are preferably mounted widely apart. In Figs. 16 and 17 these surfaces are illustrated in combination with the rear surfaces or tail of a flying machine and of course it will be understood that they may be applied in various forms to the tail of any flying machine. In Fig. 18 a rear supporting surface or tail is illustrated similar in construction to what is generally known as the tail of a Farman flying machine and in this construction it will be observed that the surfaces present no lateral walls but that either or both of said surfaces are preferably inclined at an angle to the horizontal in such a manner that the distance between the front edges is less than the distance between the rear edges of the same.

In all of these constructions it will be observed that the surfaces work in opposition. In each pair of surfaces there is an opposing tendency. Speaking now with reference to the outwardly directed surfaces, it will be readily understood that should the machine tend to direct its nose toward the earth rightwardly the increase of the surface presented at the nose immediately and automatically presents additional resistance to the change, thereby checking, retarding, steadying, and correcting, and this applies if the machine should have a tendency to dip to the other side or to turn suddenly from its direct course. The application of these surfaces at the tail of the machine while not affecting the machine in exactly the same manner, incorporates a similar action or result.

When the opposing surfaces in the tail are constructed after the manner shown in Fig. 18, that is to say presenting the opposing surfaces in planes substantially horizontal, the result is naturally a steadying of the machine in a vertical line and serves as a check upon any sudden fall or rise of the tail. These inclinations of the upper and lower surfaces may be varied according to the construction of the machine.

One of the further advantages of the surfaces referred to herein is that when turning while in flight, excessive tipping or excessive turning is avoided.

Of course it will be understood that the surfaces may project below the elevator or forward surface or the rear surface of the machine as well as above the same. In fact various modifications in the placing, construction, arrangement and application of these surfaces may be made without departing from the spirit of the invention as set forth in the claims.

I claim:

1. In an aeronautical apparatus, a pair of relatively small, opposed, stabilizing surfaces, in combination with main supporting surfaces in longitudinal alinement with said pair of said stabilizing surfaces each of said opposed surfaces immovably secured at an angle to the longitude of said apparatus and adapted to be effective independently of the main supporting surfaces of said apparatus.

2. In an aeronautical apparatus, a pair of relatively small, opposed, stabilizing surfaces, in combination with a transverse surface independent of main supporting surfaces, said opposed surfaces located in longitudinal alinement with said main supporting surfaces, each of said opposed surfaces immovably secured at an angle to the longitude of said apparatus and adapted to be effective independently of the main supporting surfaces of said apparatus, said opposed surfaces being independent of the elevator or tail surfaces of said apparatus.

3. In an aeronautical apparatus, a pair of relatively small, opposed, stabilizing surfaces, in combination with main supporting surfaces in longitudinal alinement with said pair of stabilizing surfaces, each of said opposed surfaces immovably secured at an angle to the longitude of said apparatus and adapted to be effective independently of the main supporting surfaces of said apparatus, said opposed surfaces being independent of the elevator or tail surfaces of said apparatus.

4. In an aeronautical apparatus, a pair of relatively small, opposed, stabilizing surfaces, in combination with main supporting surfaces in longitudinal alinement with said pair of stabilizing surfaces, each of said opposed surfaces immovably secured at an angle to the longitude of said apparatus and adapted to be effective independently of the main supporting surfaces of said apparatus, said opposed surfaces independent of the elevator or tail surfaces of said apparatus, each of said opposed surfaces being at an angle to the vertical of said apparatus.

5. In an aeronautical apparatus, a pair of relatively small, opposed, stabilizing surfaces, connected by a supporting surface, in combination with main supporting surface in longitudinal alinement with said aforestated surfaces, each of said opposed surfaces immovably secured at an angle to the longitude of said surface and adapted to be effective independently of the main supporting surface of said apparatus.

In testimony whereof I affix my signature in presence of two witnesses.

WILSON S. HOWELL, Jr.

Witnesses:
LOUISE ENDERLE,
THOMAS A. HILL.